United States Patent
Murthy et al.

(10) Patent No.: US 7,047,253 B1
(45) Date of Patent: May 16, 2006

(54) MECHANISMS FOR STORING CONTENT AND PROPERTIES OF HIERARCHICALLY ORGANIZED RESOURCES

(75) Inventors: Ravi Murthy, Hayward, CA (US); Eric Sedlar, San Francisco, CA (US); Nipun Agarwal, Santa Clara, CA (US); Neema Jalali, Belmont, CA (US)

(73) Assignee: Oracle Interntional Corporation, Redwood Shores, CA (US)

( * ) Notice: Subject to any disclaimer, the term of this patent is extended or adjusted under 35 U.S.C. 154(b) by 441 days.

(21) Appl. No.: 10/256,524

(22) Filed: Sep. 27, 2002

Related U.S. Application Data

(60) Provisional application No. 60/378,800, filed on May 7, 2002, provisional application No. 60/326,052, filed on Sep. 28, 2001.

(51) Int. Cl.
*G06R 17/30* (2006.01)
(52) U.S. Cl. .................................. 707/103 R
(58) Field of Classification Search ................ 707/102, 707/1–10, 100–104.1, 200–205; 704/275; 455/414.1; 709/220
See application file for complete search history.

(56) References Cited

U.S. PATENT DOCUMENTS

| | | | |
|---|---|---|---|
| 5,295,261 A | 3/1994 | Simonetti | 395/600 |
| 5,404,513 A | 4/1995 | Powers et al. | |
| 5,467,471 A | 11/1995 | Bader | 395/600 |
| 5,680,614 A | 10/1997 | Bakuya et al. | |
| 5,724,577 A | 3/1998 | Exley et al. | 395/611 |
| 5,734,887 A | 3/1998 | Kingberg et al. | 395/604 |
| 5,878,415 A | 3/1999 | Olds | |
| 5,974,407 A | 10/1999 | Sacks | |
| 5,987,506 A | 11/1999 | Carter et al. | |

(Continued)

FOREIGN PATENT DOCUMENTS

WO   WO 00/49533   8/2000

(Continued)

OTHER PUBLICATIONS

Dragos Manolescu, Review of Metadata solutions: using metamodels, repositories, SML, and enterprise portals to generate information on demand by Adrienne Tannenbaum, Mar. 2003, ACM Press, vol. 28, Issue 2, p. 38.*

(Continued)

*Primary Examiner*—Diane D. Mizrahi
(74) *Attorney, Agent, or Firm*—Marcel K. Bingham; Hickman Palermo; Truong & Becker LLP

(57) ABSTRACT

Various techniques are provided for facilitating the management of hierarchical data within a relational database system. One such technique involves separating the storage structures used to store data that captures the information about the hierarchy (the "hierarchy structures"), from the storage structures used to store the content of the resources that belong to the hierarchy (the "content structures"). Techniques are also provided for allowing users to customize the metadata attributes associated with resources that belong to the information hierarchy. One technique involves registering XML schemas that specify the metadata attributes desired by a user. Another technique involves storing attributes that do not correspond to any declared field in a "catch-all" column within the resource table. Techniques are provided for determining how to store resources as they are added to the database. According to one technique, the database server searches the data of the resource to find content-type information. If content-type information is found, then the database server consults a content-type to content-structure mapping to determine where to store the content of the resource.

54 Claims, 6 Drawing Sheets

U.S. PATENT DOCUMENTS

| | | | |
|---|---|---|---|
| 6,038,563 | A | 3/2000 | Bapat et al. |
| 6,055,544 | A | 4/2000 | DeRose et al. |
| 6,061,684 | A | 5/2000 | Glasser et al. |
| 6,128,610 | A | 10/2000 | Srinivasan et al. |
| 6,141,655 | A | 10/2000 | Johnson et al. |
| 6,154,741 | A | 11/2000 | Feldman |
| 6,199,195 | B1 | 3/2001 | Goodwin et al. |
| 6,208,993 | B1 | 3/2001 | Shadmone |
| 6,236,988 | B1 | 5/2001 | Aldred |
| 6,263,332 | B1 | 7/2001 | Nasr et al. |
| 6,269,380 | B1 | 7/2001 | Terry et al. |
| 6,279,006 | B1 | 8/2001 | Shigemi et al. |
| 6,279,007 | B1 | 8/2001 | Uppala |
| 6,298,349 | B1 | 10/2001 | Toyoshima et al. |
| 6,343,287 | B1 | 1/2002 | Kumar et al. |
| 6,356,920 | B1 | 3/2002 | Vandersluis |
| 6,366,934 | B1 | 4/2002 | Cheng et al. |
| 6,370,537 | B1 | 4/2002 | Gilbert et al. |
| 6,470,344 | B1 | 10/2002 | Kothuri et al. |
| 6,487,546 | B1 | 11/2002 | Witkowski |
| 6,496,842 | B1 | 12/2002 | Lyness |
| 6,571,231 | B1 | 5/2003 | Sedlar ............................ 707/1 |
| 6,604,100 | B1 | 8/2003 | Fernandez et al. |
| 6,636,845 | B1 | 10/2003 | Chau et al. |
| 6,718,322 | B1 | 4/2004 | Brye ............................. 707/3 |
| 6,725,212 | B1 | 4/2004 | Couch et al. |
| 6,754,661 | B1 | 6/2004 | Hallin et al. ................ 707/100 |
| 6,772,350 | B1 | 8/2004 | Belani et al. |
| 6,785,673 | B1 | 8/2004 | Fernandez et al. |
| 2002/0184401 | A1 | 12/2002 | Kadel, Jr. et al. |
| 2003/0004937 | A1* | 1/2003 | Salmenkaita et al. .......... 707/3 |
| 2003/0009361 | A1 | 1/2003 | Hancock et al. |
| 2003/0065659 | A1 | 4/2003 | Agarwal et al. |
| 2003/0093672 | A1 | 5/2003 | Chicowlas |
| 2003/0101194 | A1 | 5/2003 | Rys et al. |
| 2003/0172135 | A1* | 9/2003 | Bobick et al. .............. 709/220 |
| 2003/0182624 | A1 | 9/2003 | Large |
| 2004/0043758 | A1* | 3/2004 | Sorvari et al. ........... 455/414.1 |
| 2004/0064466 | A1 | 4/2004 | Manikutty et al. |
| 2004/0176958 | A1* | 9/2004 | Salmenkaita et al. ....... 704/275 |
| 2004/0225680 | A1* | 11/2004 | Cameron et al. ........ 707/104.1 |
| 2005/0050058 | A1 | 3/2005 | Jain et al. |
| 2005/0050092 | A1 | 3/2005 | Jain et al. |

FOREIGN PATENT DOCUMENTS

| | | |
|---|---|---|
| WO | WO 01/59602 A1 | 8/2001 |
| WO | WO 01/61566 A1 | 8/2001 |

OTHER PUBLICATIONS

Ruey-Shun Chen et al, Developing an XML framework for metadata system, Trinity College Dublin, Proc. of the 1st Inter. Sympo. on Information and Communication, pp. 267-272.*

Josephine Cheng et al., "IBM DB2 XML Extender, An end-to-end solution for storing and retrieving XML documents.," IEEE, ICDE '00 Conference, San Diego, Feb. 2000, 128 pages.

Hansrudi Noser, et al., "Dynamic 3D Visualization of Database-Defined Tree Structures on the WWW by Using Rewriting Systems," 2000, IEEE, XP-002262516, pp. 247-254.

Sushil Jajodia, et al., "Toward a Multilevel Secure Relational Data Model," ACM, 1991, 8393 SIGMOD Record, 20 (1991) Jun., No. 2, New York, US, XP 000364619, pp. 50-59.

R. Bourret, et al., "A Generic Load/Extract Utility For Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.

S. Vorthmann, et al. "Beyond Schemas, Schema Adjuncts and the Outside World," Markup Languages, Online!, vol. 2, No. 3, Jun. 2000, pp. 1-8.

Mi-Ok Chae, et al., "Design and Implementation of an Object-Oriented Multimedia DBMS Tightly Coupled with Information Retrieval Functions," Proc. 17th IASTED International Conference on Applied Informatics, Feb. 15-18, 1999, abstract.

Daniele Braga et al., "A Graphical Environment to Query XML Data with Query," Proceedings of the Fourth International Conference on Web Information Systems Engineering (WISE '03), 2003, IEEE, 10 pages.

* cited by examiner

FIG. 3

| NODE | NAME | DATA |
|---|---|---|
| 1 | a | D1 |
| 2 | b | D2 |
| 3 | c | D3 |
| 4 | d | D4 |
| 5 | e | D5 |
| 6 | f | D6 |
| 7 | a | D7 |

| PARENT | CHILD |   |
|---|---|---|
| <ROOT> | 1 | ← 352 |
| 1 | 2 | ← 354 |
| 1 | 3 | ← 356 |
| 2 | 4 | ← 358 |
| 2 | 5 | ← 360 |
| 3 | 6 | ← 362 |
| 3 | 7 | ← 364 |

FIG. 5

| NODE | NAME | DATA TYPE | DATA REF | CREATION DATE | MOD DATE | ANY |
|------|------|-----------|----------|---------------|----------|-----|
| 1 | a | T1 | | 5/5/01 | 7/3/01 | |
| 2 | b | T2 | | 6/6/02 | 6/6/02 | |
| 3 | c | T5 | | 4/3/00 | 5/9/01 | |
| 4 | d | T2 | | 4/3/00 | 8/7/01 | |
| 5 | e | T3 | | 4/3/00 | 12/24/01 | |
| 6 | f | T6 | | 6/6/02 | 3/3/03 | |
| 7 | a | T9 | | 6/6/02 | 7/8/02 | |

MECHANISMS FOR STORING CONTENT AND PROPERTIES OF HIERARCHICALLY ORGANIZED RESOURCES

RELATED APPLICATIONS

U.S. patent application Ser. No. 10/260,138, filed on Sep. 27, 2002, entitled OPERATORS FOR ACCESSING HIERARCHICAL DATA IN A RELATIONAL SYSTEM, by NIPUN AGARWAL, RAVI MURTHY, ERIC SEDLAR, SIVASANKARAN CHANDRASEKAR and FEI GE;

U.S. patent application Ser. No. 10/260,384, filed on Sep. 27, 2002, entitled PROVIDING A CONSISTENT HIERARCHICAL ABSTRACTION OF RELATIONAL DATA, by NIPUN AGARWAL, ERIC SEDLAR, RAVI MURTHY and NAMIT JAIN;

U.S. patent application Ser. No. 10/259,278, filed on Sep. 27, 2002, entitled MECHANISM FOR MAPPING XML SCHEMAS TO OBJECT-RELATIONAL DATABASE SYSTEMS, by RAVI MURTHY, MURALIDHAR KRISHNAPRASAD, SIVASANKARAN CHANDRASEKAR, ERIC SEDLAR, VISWANATHAN KRISHNAMURTHY and NIPUN AGARWAL;

U.S. patent application Ser. No. 10/260,161, filed on Sep. 27, 2002, entitled INDEXING TO EFFICIENTLY MANAGE VERSIONED DATA IN A DATABASE SYSTEM, BY NIPUN AGARWAL, ERIC SEDLAR and RAVI MURTHY;

U.S. patent application Ser. No. 10/259,176, filed on Sep. 27, 2002, entitled MECHANISM FOR UNIFORM ACCESS CONTROL IN A DATABASE SYSTEM, by RAVI MURTHY, ERIC SEDLAR, NIPUN AGARWAL, SAM IDICULA and NICK MONTOYA;

U.S. patent application Ser. No. 10/256,777, filed on Sep. 27, 2002, entitled LOADABLE UNITS FOR LAZY MANIFESTATION OF XML DOCUMENTS by SYAM PANNALA, ERIC SEDLAR, BHUSHAN KHALADKAR, RAVI MURTHY, SIVASANKARAN CHANDRASEKAR, and NIPUN AGARWAL;

U.S. patent application Ser. No. 10/260,381, filed on Sep. 27, 2002, entitled MECHANISM TO EFFICIENTLY INDEX STRUCTURED DATA THAT PROVIDES HIERARCHICAL ACCESS IN A RELATIONAL DATABASE SYSTEM, by NEEMA JALALI, ERIC SEDLAR, NIPUN AGARWAL, and RAVI MURTHY;

FIELD OF THE INVENTION

The present invention relates to storing hierarchical information in a database and, more specifically, to techniques for customizing the metadata and content structures associated with the information.

BACKGROUND OF THE INVENTION

Humans tend to organize information in categories. The categories in which information is organized are themselves typically organized relative to each other in some form of hierarchy. For example, an individual animal belongs to a species, the species belongs to a genus, the genus belongs to a family, the family belongs to an order, and the order belongs to a class.

With the advent of computer systems, techniques for storing electronic information have been developed that largely reflected this human desire for hierarchical organization. Conventional computer file systems, for example, are typically implemented using hierarchy-based organization principles. Specifically, a typical file system has directories arranged in a hierarchy, and documents stored in the directories. Ideally, the hierarchical relationships between the directories reflect some intuitive relationship between the meanings that have been assigned to the directories. Similarly, it is ideal for each document to be stored in a directory based on some intuitive relationship between the contents of the document and the meaning assigned to the directory in which the document is stored.

FIG. 1 shows an example of a typical file system. The illustrated file system includes numerous directories arranged in a hierarchy. Two documents 118 and 122 are stored in the directories. Specifically, documents 118 and 122, both of which are entitled "Example.doc", are respectively stored in directories 116 and 124, which are respectively entitled "Word" and "App4".

In the directory hierarchy, directory 116 is a child of directory 114 entitled "Windows", and directory 114 is a child of directory 110. Similarly, directory 124 is a child of directory 126 entitled "VMS", and directory 126 is a child of directory 110. Directory 110 is referred to as the "root" directory because it is the directory from which all other directories descend. In many systems, the symbol "/" is used to refer to the root directory.

When electronic information is organized in a hierarchy, each item of information may be located by following a "path" through the hierarchy to the entity that contains the item. Within a hierarchical file system, the path to an item begins at the root directory and proceeds down the hierarchy of directories to eventually arrive at the directory that contains the item of interest. For example, the path to file 118 consists of directories 110, 114 and 116, in that order.

Hierarchical storage systems often allow different items to have the same name. For example, in the file system shown in FIG. 1, both of the documents 118 and 122 are entitled "Example.doc". Consequently, to unambiguously identify a given document, more than just the name of the document is required.

A convenient way to identify and locate a specific item of information stored in a hierarchical storage system is through the use of a "pathname". A pathname is a concise way of uniquely identifying an item based on the path through the hierarchy to the item. A pathname is composed of a sequence of names. In the context of a file system, each name in the sequence of names is a "filename". The term "filename" refers to both the names of directories and the names of documents, since both directories and documents are considered to be "files".

Within a file system, the sequence of filenames in a given pathname begins with the name of the root directory, includes the names of all directories along the path from the root directory to the item of interest, and terminates in the name of the item of interest. Typically, the list of directories to traverse is concatenated together, with some kind of separator punctuation (e.g., '/', '\', or ';') to make a pathname. Thus, the pathname for document 118 is /Windows/Word/Example.doc, while the pathname for document 122 is /VMS/App4/Example.doc.

The relationship between directories (files) and their contained content varies significantly between different types of hierarchically organized systems. One model, employed by various implementations, such as Windows and DOS file systems, requires each file to have exactly one parent, forming a tree. In a more complicated model, the hierarchy takes the form of a directed graph, where files can have multiple parents, as in the UNIX file system in which hard links are used.

In contrast to hierarchical approaches to organizing electronic information, a relational database stores information in tables comprised of rows and columns. Each row is identified by a unique RowID. Each column represents an attribute of a record, and each row represents a particular record. Data is retrieved from the database by submitting queries to a database management system (DBMS) that manages the database. The queries must conform to the database language supported by the database management system. Structured Query Language (SQL) is an example of a database language supported by many existing database management systems.

Each type of storage system has advantages and limitations. A hierarchically organized storage system is simple, intuitive, and easy to implement, and is a standard model used by most application programs. Unfortunately, the simplicity of the hierarchical organization does not provide the support required for complex data retrieval operations. For example, the contents of every directory may have to be inspected to retrieve all documents created on a particular day that have a particular filename. Since all directories must be searched, the hierarchical organization does nothing to facilitate the retrieval process.

A relational database system is well suited for storing large amounts of information and for accessing data in a very flexible manner. Relative to hierarchically organized systems, data that matches even complex search criteria may be easily and efficiently retrieved from a relational database system. However, the process of formulating and submitting queries to a database server is less intuitive than merely traversing a hierarchy of directories, and is beyond the technical comfort level of many computer users.

In the past, hierarchically organized systems and relationally organized systems have been implemented in different ways that were not compatible. With some additional processing, however, a relationally organized system can emulate a hierarchically organized system. This type of emulation is especially desirable when the storage capability and flexibility of a relational system is needed, but the intuitiveness and ubiquity of the hierarchical system is desired.

SUMMARY OF THE INVENTION

Techniques are provided for managing data stored in a database system. In one embodiment, the techniques involve the steps of: storing information in content structures that are separate from hierarchy structures; and storing metadata for a plurality of resources in the hierarchy structures. The metadata includes: location data, associated with a given resource of the plurality of resources, that identifies which information in the content structures represents content of the given resource; hierarchy data that indicates a position, within an information hierarchy, of each of the resources.

Techniques are also provided that involve the steps of: storing, within the database, contents of resources that belong to an information hierarchy; storing, within the database, data that captures the hierarchy of the resources that belong to the information hierarchy; determining, based on one or more XML schemas, which metadata attributes to store for the resources; creating one or more structures, within the database, to store the metadata attributes based on the one or more XML schemas; storing, within the one or more structures, values for the metadata attributes associated with the resources.

Finally, techniques are provided for adding data, associated with a resource, to a database. According to one embodiment, the techniques involve the steps of: receiving, at a database server that manages the database, the data for the resource; inspecting the data to locate content-type information in the data; storing values for a set of metadata attributes for the resource in a first set of one or more tables without regard to any content-type information in the data; selecting a second set of one or more tables based on content-type information found in the data; and storing values for resource attributes of the resource in the second set of one or more tables.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a block diagram of relational tables that can be used to capture the hierarchy illustrated in FIG. 2, according to an embodiment of the invention;

FIG. 5 is a block diagram of a resource table that includes a catch-all ANY column according to an embodiment of the invention.

DETAILED DESCRIPTION OF THE INVENTION

Figure 1:
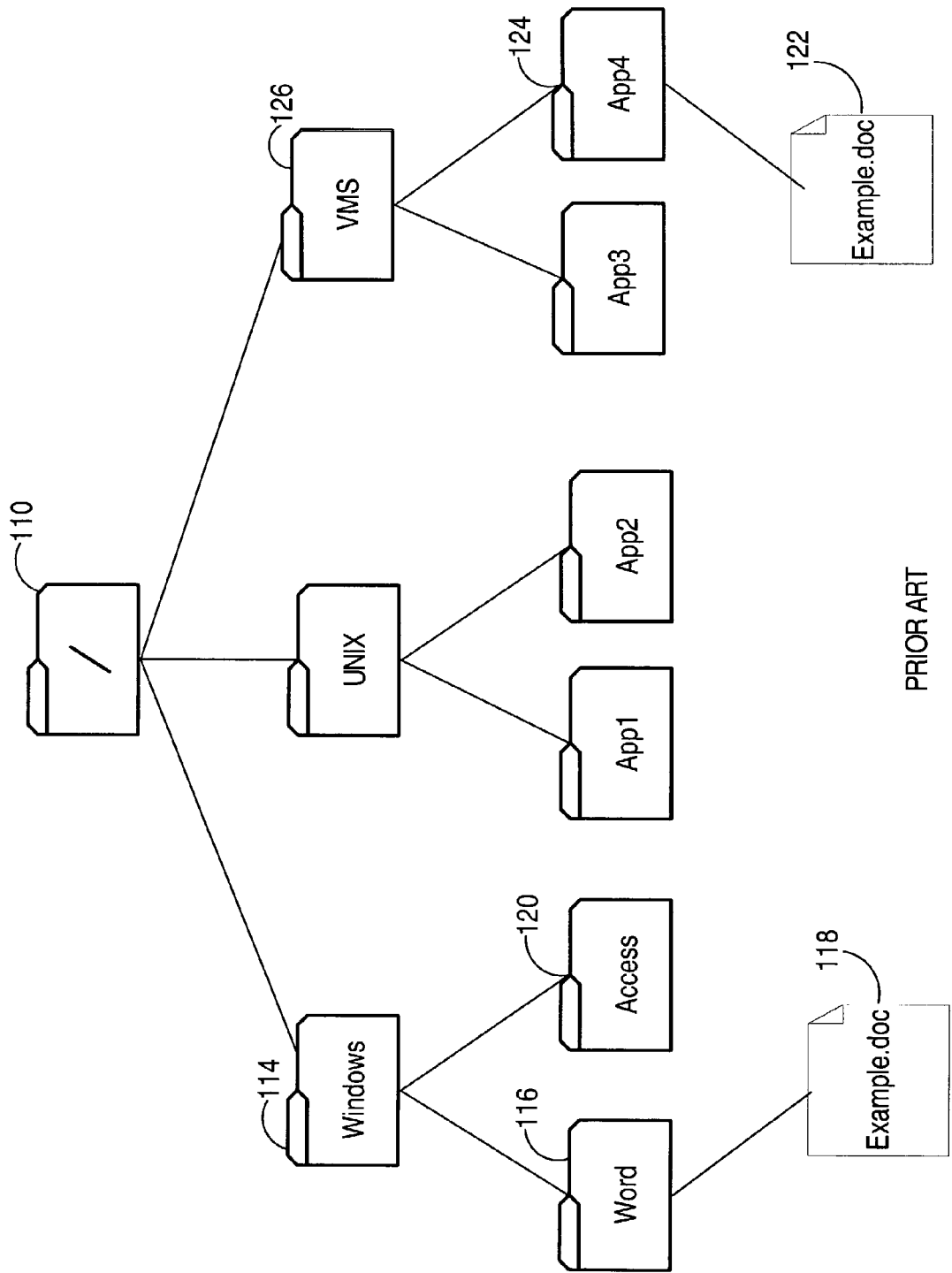
FIG. 1 is a block diagram showing a hierarchical file system.

A method and system are described for storing resources that belong to an information hierarchy into structures within a relational database system. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Various techniques are provided for facilitating the management of hierarchical data within a relational database system. One such technique involves separating (1) the storage structures used to store data that captures the information about the hierarchy (the "hierarchy structures"), from (2) the storage structures used to store the content of the resources that belong to the hierarchy (the "content structures"). By separating the hierarchy structures from the content structures, the same hierarchy structures may be used for multiple hierarchies, since the hierarchy structures are insulated from the custom aspects that may apply to different types of data used by different hierarchies. Similarly, the hierarchy structures may be used to establish a hierarchy that contains distinct types of information without impairing the accessibility of the information. The accessibility is not impaired, because the content structures for holding data for one type of resource may be established independently of the content structures for holding the data for another type of resource, even though both types of resources are in the same hierarchy. Thus, users may define the content structures for the resources in the hierarchy based on the nature of the resources, and are not bound by a "one size fits all" arrangement for storing the content. Also, because the hierarchy structures are separate from the content structures, a hierarchy may be established for existing relational data with minimal effect on (1) the storage of that data, and (2) the existing queries used to access that data.

Techniques are also provided for allowing users to customize the metadata attributes associated with resources that belong to the information hierarchy. For example, one user may wish to store an "importance ranking" with each of her resources, while another user may wish to store a "delete by" date with each of his resources. One technique involves registering XML schemas that specify the metadata attributes desired by a user. Another technique involves storing attributes that do not correspond to any declared field in a "catch-all" column within the resource table.

Finally, techniques are provided for determining how to store resources as they are added to the database. According to one embodiment, the database server searches the content of the resource to find content-type information. If content-type information is found, then the database server consults a content-type to content-structure mapping to determine where to store the content of the resource. If content-type information is not found, the database server executes a default storage procedure, such as storing the content of the resource in a LOB column of the row for the resource, within the resource table.

Another embodiment of the invention is to associate specific content structures with specific nodes within the information hierarchy. Whenever resources are inserted within or under the node, the corresponding content structures are used.

Storing Hierarchical Data in a Database System

Figure 2:
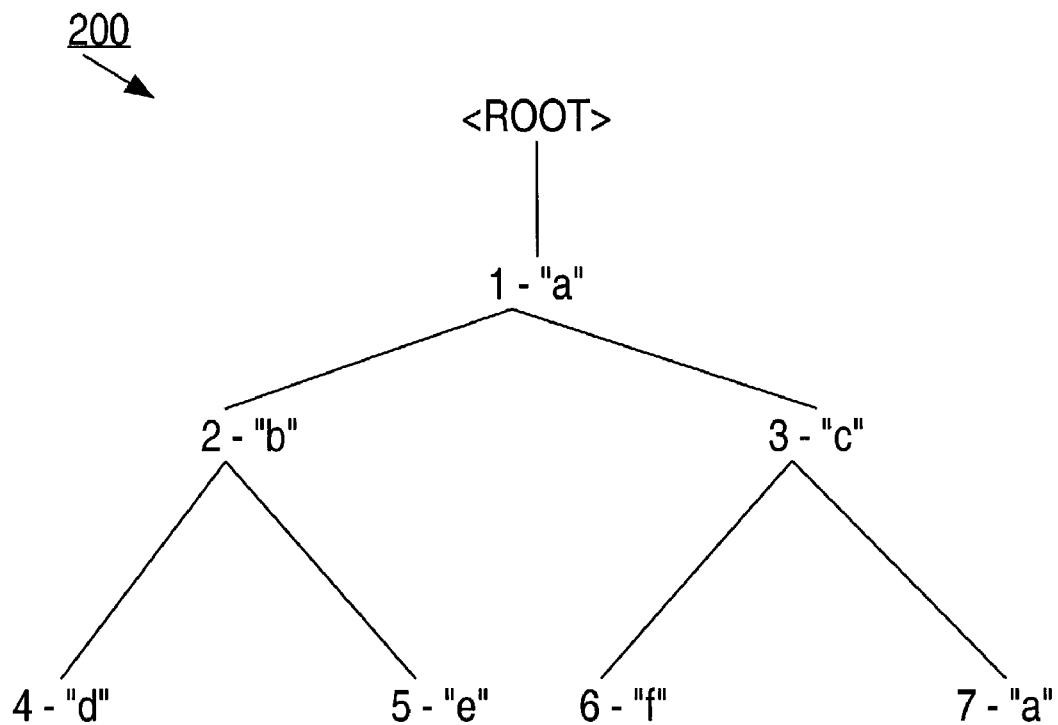
FIG. 2 is a block diagram showing a hierarchy of nodes that are associated with resources.

FIG. 2 is a block diagram that illustrates a hierarchy 200 that is used in examples that are provided herein to facilitate an understanding of embodiments of the invention. Hierarchy 200 includes eight nodes. The highest node in the hierarchy is referred to as the "root" node. The nodes at the end of each branch in the hierarchy are "leaf" nodes. The nodes between the root node and the leaf nodes are "intermediate" nodes. In the illustrated hierarchy, nodes 1, 2, and 3 are intermediate nodes, and nodes 4, 5, 6, and 7 are leaf nodes.

In an information hierarchy, the nodes correspond to information. Typically, the piece of information associated with each node will have some form of name, metadata properties, and some type of content. For example, in a hierarchy that corresponds to a hierarchical file system, the nodes will typically correspond to files (where a "folder" or "directory" is one type of file). Each such file will have a name, metadata properties (such as owner, creation date, etc.) and some form of contents.

In many situations, the names that are associated with the nodes in a hierarchy need not be unique. In the example shown in FIG. 2, both node 1 and node 7 have the name "a". Though they have the same name, they are separate and distinct nodes, which occupy different positions in the hierarchy and may be associated with completely different content.

One-Size-Fits-All

FIG. 3 is a block diagram of two tables 302 and 350 that may be used to represent hierarchy 200 in a relational database system. Table 302 includes one row for each node in the hierarchy. The row for a given node includes the name associated with the given node and the data associated with the given node. For example, row 304 corresponds to node 1, and contains the name "a" and data 306 associated with node 1. Table 302 is an example of a one-size-fits-all approach in that the data for all resources in the hierarchy are stored in the same structure, regardless of the data type of those resources. In the example of table 302, the data structure used to store the content of the resources is the single column 308. The data type for such a column could be, for example, a LOB (Large Object) type, such as a Binary LOB (BLOB) or a Character LOB (CLOB).

Table 350 includes one row for each of the parent-child relationships in hierarchy 200. A parent column 378 holds the value that specifies the parent in a parent-child relationship, and a child column 380 holds the value that specifies the child of the parent-child relationship. For example, row 352 indicates that the root node is the parent of node 1. Similarly, rows 354 and 356 respectively indicate that node 1 is the parent of nodes 2 and 3.

Separating Hierarchical Structures from Content Structures

Tables 302 and 350 capture all the information of the hierarchy 200 in relational format. However, it may not be possible to fully utilize the power of the relational database system if the content of the resources associated with hierarchy 200 are stored using the one-size-fits-all approach represented by table 302. Specifically, table 302 includes a single column for storing the content of the resources associated the nodes in the hierarchy 200. This storage format may be sufficient when the resource associated with a node is a simple data type, such as a string or integer. However, in many situations the resources associated with the nodes in the hierarchy will be complex data types, such as complex records or XML documents. In such situations, the storage of the resource content in a single column inhibits the user's ability to run complex searches against the content. Even when the relational database system provides support for searching within a single column for values of subcomponents of complex resources, the performance of such searches is impaired.

According to one embodiment of the invention, the problems associated with storing and searching the content of complex resources that belong to an information hierarchy are overcome by storing the content of the resources associated with the nodes separately from the tables that capture the hierarchy information.

Figure 4:
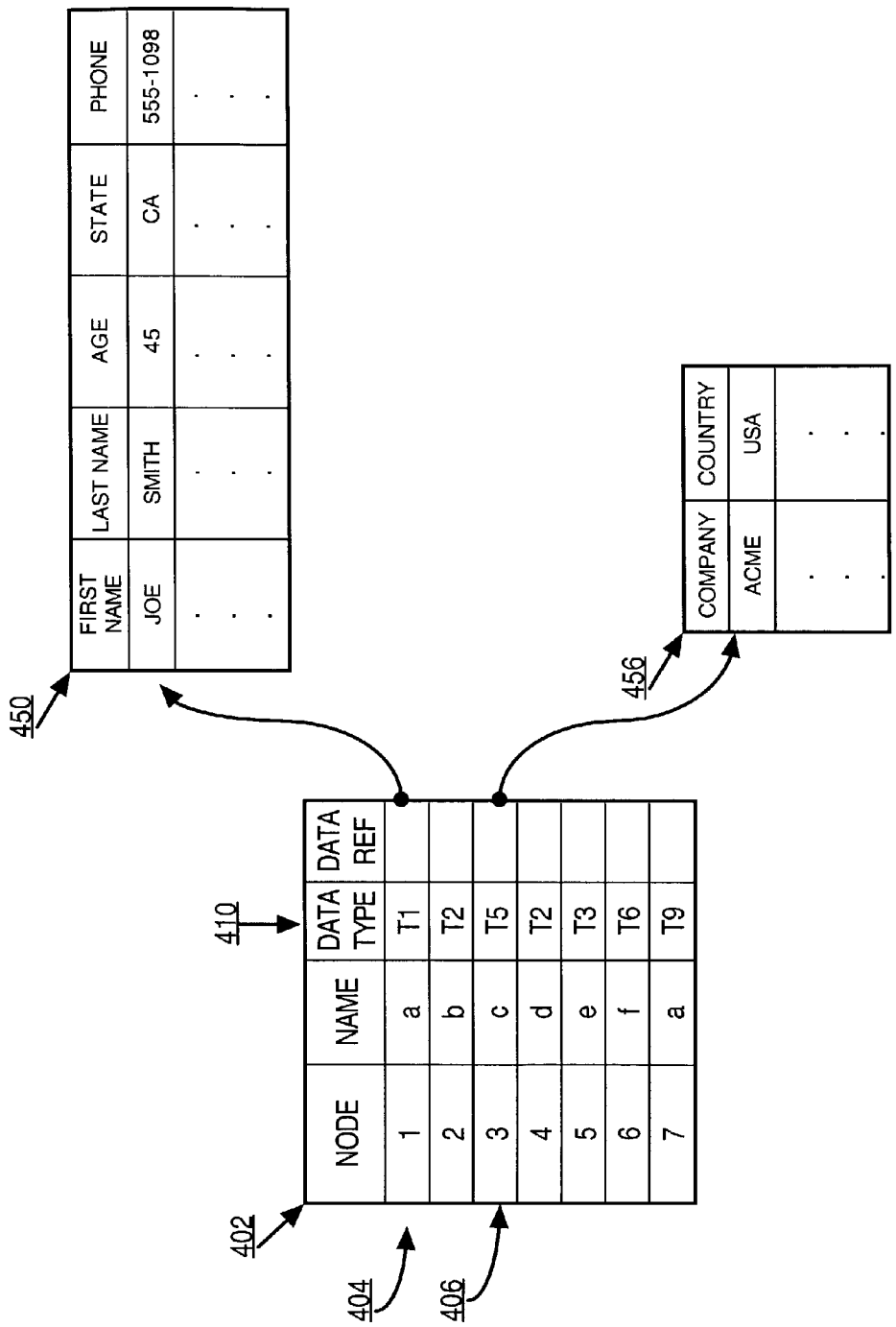
FIG. 4 is a block diagram illustrating the separation of hierarchy structures and content structures according to an embodiment of the invention.

FIG. 4, for example, shows a resource table 402 similar to table 302. However, resource table 402 differs from table 302 in that resource table 402 no longer stores that content of each resource in a column of the row for that resource. Rather, the DATA column of table 302 is replaced in resource table 402 with two columns DATA TYPE and DATA REF.

For each row of resource table 402, the DATA TYPE column stores data that indicates the type of resource associated with the node identified in the row. For example, row 404 corresponds to node 1 of hierarchy 200. The DATA TYPE column of row 404 indicates that the resource associated with node 1 is of type T1. Similarly, row 406 corresponds to node 3 and the DATA TYPE column of row 406 indicates that the resource associated with node 3 is of type T5.

For each row of resource table 402, the DATA REF column stores a reference to the contents of the resource associated with the node identified in the row. As used herein, the term "reference" generally refers to any data used within a database system to locate other data. For example, the DATA REF column can store pointers, or more complex information such as the "ref" data type supported by Oracle database systems. The present invention is not limited to any particular type of data for locating the resources associated with nodes in a hierarchy.

Various benefits are realized by storing the content of resources separately from the hierarchical structures that are used to capture and reflect the hierarchical relationships between the resources. For example, because the resources are stored separately from resource table 402, the content structures in which the resources are stored may be defined based on the nature of the resources. For example, the resource associated with node 1 is an employee record, and is stored in a table 450 that has columns for each of the fields of an employee record. On the other hand, the resource associated with node 3 is a company record, and is stored in a table 456 that has columns for each of the fields of a company record.

Also, because the hierarchy structures (e.g. tables 402 and 350) are separate from the content structures (e.g. tables 450 and 456), a hierarchy may be established for existing relational data with minimal effect on the storage of that data, and without requiring modification to the existing queries used to access that data. For example, the employee table 450 may have existed long before the decision to arrange information into the hierarchy 200. Also prior to that decision, many queries and views may have been defined for accessing table 450. Because tables 350 and 402 can be created without affecting the existing structure of table 450, the hierarchical structures for a hierarchy 200 that includes resources stored in table 450 may be established without the need to modify table 450 or the existing queries and views that access table 450.

According to one embodiment, resource table 402 may be implemented in a way that uses the one-size-fits-all approach for some resources, and contains references to the contents for other resources. For example, while the content of the resource associated with node 1 may be stored in table 450, the content of the resource associated with node 2 may continue to be stored in a single LOB column within table 402. The data type of a resource, as indicated in the DATA TYPE column, may be used by the database server as one factor in determining whether to store the resource content within a LOB column of the resource table 402 or in one or more separate tables.

Additional Resource Table Columns

According to one embodiment, table 402 includes additional columns for holding additional information about the resource associated with each row. In one embodiment, for example, table 402 includes a STICKY column (not shown) that holds a Boolean value for those resources whose content is located external to the resource table 402. If the value in the STICKY column of the row associated with a resource is "TRUE", then (1) the resource table row is deleted when the content of the resource is deleted, and (2) the content of the resource is deleted when the resource table row is deleted. If the STICKY value is FALSE, then the deletion of the content does not cause the deletion of the resource table row, and the deletion of the resource table row does not cause deletion of the content.

The STICKY column is merely one example of the various columns that resource table 402 may possess. Other examples of columns include:

VERSION_ID: indicates the version of a resource.

INVALID: indicates whether the user has marked the resource as invalid, for whatever reason.

In certain situations, a single column may store multiple pieces of information. For example, rather than have a separate column (e.g. STICKY and INVALID) for each piece of Boolean information, a single column can be used for storing a string of bits, where each bit in the bitstring corresponds to a different piece of Boolean information.

The actual columns of the resource table, and how they are used, will vary from implementation to implementation. Techniques that facilitate the customization of the resource table shall be described in greater detail hereafter.

Metadata Attributes

As mentioned above, the resources associated with nodes in a hierarchy may be simple, or complex. Complex resources, such as the employee records in table 450, may have many fields or attributes. The attributes associated with the content of a particular resource are referred to herein as "resource attributes". As illustrated in FIG. 4, values for the resource attributes of resources in a hierarchy are typically stored in content structures separate from the hierarchy structures. For example, the values for the resource attributes of "a" (the resource associated with node 1 in hierarchy 200) are stored in a row of table 450. Similarly, the values for the resource attributes of "c" (the resource associated with node 3 in hierarchy 200) are stored in table 456.

In addition to such resource attributes, a user may desire to maintain certain attributes, for resources in a hierarchy, that are not necessarily dictated by the content of the resources. Such attributes are referred to herein as "metadata attributes". Metadata attributes may be used, for example, to store information maintained by the system for the resources that belong to the information hierarchy. Such system-maintained attributes may include, for example, the "creation date", "last modification date", and "owner" of the resource.

The Resource Table XML Schema

According to one embodiment, the metadata attributes associated with the resources in a hierarchy are established based on an eXtensible Mark-up Language (XML) schema. The syntax and structure of such an XML schema may vary from implementation to implementation. For the purpose of explanation, it shall be assumed that such an XML schema is declared as follows:

Schema1: XML Schema for Resources

```
<resource>
    <owner> </owner>
    <name> </name>
    <creation_date> </creation_date>
    <content> </content>
</resource>
```

According to one embodiment, an XML schema is used to specify the metadata attributes that are to be supported by the resource table. The XML schema used to specify the metadata attributes that are to be supported by the resource table is referred to herein as the "resource table XML schema".

Customization by Modifying the Resource Table XML Schema

Because the resource table XML schema dictates the attributes supported by the resource table, customization of the metadata attributes is facilitated by designing the database system to automatically modify the structure of the resource table in response to revisions to the resource table XML schema. For example, if an additional tag <new_attribute> </new_attribute> is added to the resource table XML schema, then a new column "new_attribute" is implicitly added to the resource table.

According to one embodiment, the database system provides a default XML schema that may be used as the resource table XML schema. If users require additional metadata attributes that are not contained in the default XML schema, then a customized resource table XML schema may be created based on the default XML schema.

For example, assuming that Schema1 is the default XML schema. A custom XML schema could add new attributes as follows:

```
Schema2: XML Schema for Resources

<resource>
    <owner> </owner>
    <name> </name>
    <creation_date> </creation_date>
    <new_attribute1> </new_attribute1>
    <new_attribute2> </new_attribute2>
    <new_attribute3> </new_attribute3>
    <content> </content>
</resource>
```

In the example of Schema2, tags for three new attributes (new_attribute1, new_attribute2, new_attribute3) are added to the resource table XML schema. In response to the addition of these tags, the database server adds three corresponding columns to the resource table.

According to one embodiment, such custom resource table schemas may be created easily using a subclassing mechanism, where the customized resource table XML schema is declared as a subclass of the default XML schema, inherits all the attributes that are already defined in the default XML schema, and adds the additional attributes desired by a user. According to one embodiment, a user may "register" with the database system an XML schema that is declared to be a subclass of the default XML schema. In response to such registration, the database server identifies the attributes that are newly introduced by the subclass, and adds corresponding columns to the resource table.

Customization by Using the "Any" Catch-All Attribute

Instead of, or in addition to, customizations performed by adding tags to the resource table XML schema, customization can also be performed through the use of an ANY column 502 of the resource table 402. The ANY column 502, which is illustrated in FIG. 5, corresponds to an <any> element contained in the resource table XML schema. However, unlike the other elements in the resource table XML schema, the <any> element does not correspond to any particular custom attribute of the user. Rather, the <any> element causes the database system to create the ANY column 502 whose purpose is to hold any custom metadata attributes that do not have their own column. According to one embodiment, the <any> element is defined with maxoccurs="unbounded", thereby indicating that the element can correspond to any number of such custom metadata attributes.

For example, assume that a user attempts to insert into table 402 illustrated in FIG. 5 a resource that has the following metadata attributes:

```
<resource>
    <name>Fred</name>
    <data_type>T3</data_type>
    <creation_date>5/5/02</creation_date>
    <mod_date>5/5/02</mod_date>
    <importance>low</importance>
    <backup>FALSE</backup>
    <content>Fred Jones Inc.</content>
</resource>
```

In this example, the resource to be inserted has two pieces of information ("low" and "FALSE") associated with tags (<importance> and <backup>) that do not have any corresponding columns in table 402. According to one embodiment, such pieces of information, along with their corresponding tags, are stored in the "any" column 502.

Because the "any" column 502 is a catch-all column for storing anything that does not correspond to other columns, the type of data that will be stored in column 502 is not necessarily known before the data is received, and may vary from resource to resource. Thus, according to one embodiment, the "any" column 502 is declared to be an XML LOB column, thereby informing the database system that the column contains tag-demarcated data, and giving maximum flexibility with respect to the type of information that can be stored therein.

By storing tags in the "any" column 502, along with the data that is demarcated by the tags, the database server is able to support queries that refer to the fields stored in the "any" column 502 by parsing the data of the "any" column 502. Due to the need to parse the data in the "any" column 502 during such searches, execution of such queries will generally take longer than the execution would otherwise take if each of the fields referred to in the query had its own separate column. However, if a particular attribute or set of attributes is only relevant to a small percentage of the resources in resource table 402, it may be preferable to incur the performance penalty associated with parsing the contents of the "any" column rather than create separate columns for those rarely-relevant attributes.

User-Specific Metadata Attributes

Each user of a database system may wish to customize the resource table in a different way. To support such user-specific customizations, a separate resource table, with a separate customized resource table XML schema, may be maintained for each user. However, it may not be efficient to manage so many separate resource tables. Therefore, according to one embodiment, a single resource table may be used for the resources of all users, while still allowing each user to register one or more separate customized resource table XML schemas. To support all of the customized schemas, the single resource table may have columns for all metadata attributes specified in all custom schemas. Alternatively, the resource table may have columns for the most common metadata attributes, and use the "any" column for the others.

For example, assume that a first user wants to maintain a particular metadata attribute <attrib1> for all of the first user's resources. Assume that a second user wants to maintain a different metadata attribute <attrib2> for all of the second user's resources. In this example, the first user would register a custom schema that introduces <attrib1>, and the second user would register a custom schema that introduces <attrib2>. Because the resources for both users are stored in the same resource table, columns for both <attrib1> and <attrib2> would be added to the resource table. In this scenario, the resources for the first user would simply not have anything to store in the attrib2 column, and the resources for the second user would not have anything to store in the attrib1 column.

It should be noted that the customization of the metadata attributes of resources may be done at various levels. For example, the customization may be done on a per-user basis, as mentioned above. Instead of or in addition to such per-user customization, the customization may be applied based on the location of resources within the corresponding information hierarchy. For example, assume that the resources are files within a hierarchical file system. A particular customization could apply to only those files contained in a particular folder. Alternatively, the customization could apply to all files contained in the particular folder, and to all folders that are below the particular folding in the hierarchy.

According to one embodiment, when a custom schema is registered, "scope information" is stored in association with the custom schema. The scope information associated with a custom schema dictates to which resources the custom schema applies. For example, the scope information associated with one custom schema may indicate that it applies to all resources associated with a particular user. The scope information associated with another custom schema may indicate that it applies to all resources at or below a particular node in the corresponding information hierarchy.

According to one embodiment, the resource table includes a column that indicates the custom schema(s) that apply to the resource represented by each row. Such a column is depicted, for example, as the DATA TYPE column 410 in FIGS. 4 and 5. Based on the values stored in DATA TYPE column 410 of a given row, the database server determines which registered schemas apply to the resource stored in the given row. Based on the schemas that apply to the resource stored in the given row, the database server determines which columns of the resource table 402 need to be populated. If a resource is being inserted into resource table 402, the database determines whether the resource contains data for any metadata fields that are defined not in the schema that applies to the resource. As mentioned above, such data is then stored in the ANY column 502 of the resource table 402.

Directing New Data to the Correct Tables

As mentioned above, the structure of the content of resources may vary significantly from resource to resource, even though the resources may have the same metadata attributes, and may be represented in the same resource table. For example, the content attributes of resource "a", associated with row 404 of table 402 are significantly different than the content attributes of resource "c" associated with row 406 of table 402.

To support such content differences, the content may be stored in content structures separate from the hierarchy structures, where different types of content are stored in different content structures. Because the type of content a resource has determines the content structures in which the resource content is stored, the database server must be able to determine the type of content each resource has when the resource is added to the database. For example, when resource "a" (in FIG. 4) added to the database, the database server must know that, in addition to inserting row 404 for resource "a" into the resource table 402, the database server must also insert a row into table 450 to store the content of resource "a". Similarly, when resource "c" is added to the database, the database server must know that, in addition to inserting row 406 for resource "c" into the resource table 402, the database server must also insert a row into table 456 to store the content of resource "c".

Unfortunately, the interface through which users add resources to a database may not allow a user to explicitly specify the content type that applies to the resource. If the database server does not receive the content type information from the user, then the database server must determine the content type information for the resource through some other means. Once the database server is able to determine the content type, the database server can consult a content-type to content-structures mapping to determine where to store the content of a resource being added to the database.

According to one embodiment, at the time a resource is being added to the database, the database server is configured to search for content type information within the actual data of the resource being added. For example, the data for resource "a" that is inserted into row 404 of resource table 402 may include, in addition to all other tags and data:

<content_type>
    employee_record
    </content_type>

When a database server encounters the <content_type> and </content_type> tags, the server knows that information bounded by these tags identifies the content type of the resource. In the present example, "employee_record" is the content type of the resource. Once the content type information is known, the database server inspects the content-type to content-structure mapping to determine where to store the content associated with the new resource. In the present example, the content type "employee_record" would map to table 450, so the content attributes associated with resource "a" would be stored in a row of table 450. After the content is stored in the appropriate content structure, a reference used to locate the content is stored in the DATA REF column of the row of resource table 402 that is associated with the resource.

The tags <content_type> and </content_type> are merely one example of how the content type associated with a resource can be demarcated within the data of the resource. The present invention is not limited to any particular technique for demarcating the content type information. For example, another method involves using the XSI: schema location, where a known attribute is inserted into the XML content to identify its content type.

According to one embodiment, the inclusion of content type information in the data of a resource is optional. If data for a resource is inserted in the database, and the search for content type information within the resource fails to identify any content type information, then the database server may initiate default resource-handling procedures. According to one embodiment, the default resource-handling procedures involve storing the content of the resource in a LOB column of the resource table 402, rather than in any tables external to the resource table 402.

Hardware Overview

Figure 6:
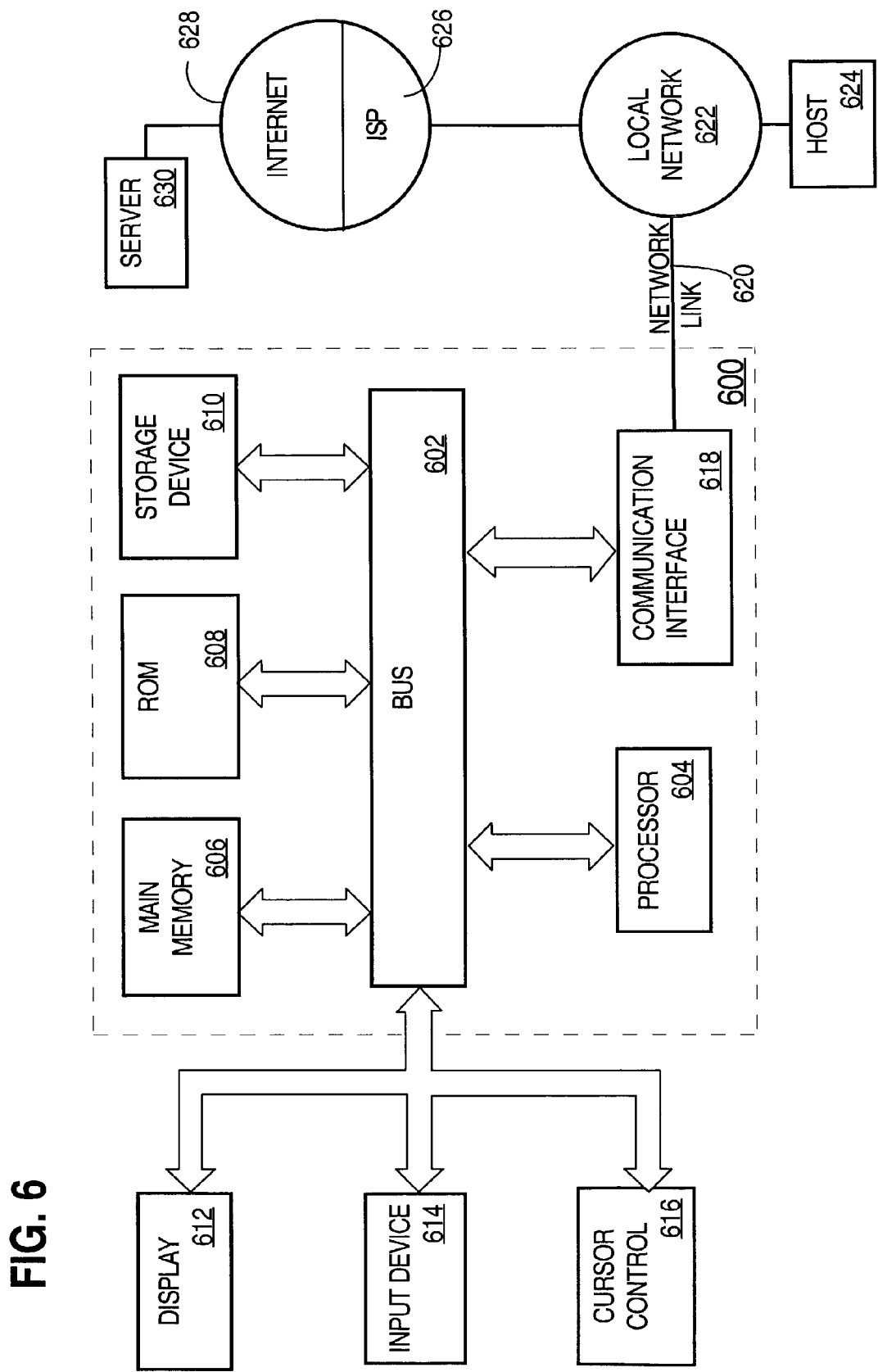
FIG. 6 is a block diagram of a computer system on which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for managing data stored in a database system the method comprising the steps of:
   storing information in content structures that are separate from hierarchy structures;
   storing metadata for a plurality of resources in said hierarchy structures, wherein said metadata includes:
      location data, associated with a given resource of said plurality of resources, that identifies which information in said content structures represents content of said given resource; and
      hierarchy data that indicates a position, within an information hierarchy, of each of said resources; and
   wherein:
      said content structures include a resource table;
      said given resource is a first resource that is represented by a first row of said resource table;
      location data for said first resource indicates that information in a first set of one or more tables represents content of said first resource;
      said resource table includes a second row that represents a second resource;
      location data for said second resource indicates that information in a second set of one or more tables represents content for said second resource; and
      said first set of one or more tables are different tables than said second set of one or more tables.

2. A computer-implemented method for managing data stored in a database system, the method comprising the steps of:
   storing information in content structures that are separate from hierarchy structures;
   storing metadata for a plurality of resources in said hierarchy structures, wherein said metadata includes:
      location data, associated with a given resource of said plurality of resources, that identifies which information in said content structures represents content of said given resource; and
      hierarchy data that indicates a position, within an information hierarchy, of each of said resources;
   wherein the content structures do not store data that reflects the hierarchy of information in said information hierarchy;
   creating said hierarchy structures after said content structures are created and populated; and
   after creating said hierarchy structures, populating said hierarchy structures with metadata that establishes a hierarchy between information stored in said content structures without altering the structure of said content structures.

3. A computer-implemented method for managing data stored in a database system the method comprising the steps of
   storing information in content structures that are separate from hierarchy structures;
   storing metadata for a plurality of resources in said hierarchy structures, wherein said metadata includes:
      location data, associated with a given resource of said plurality of resources, that identifies which information in said content structures represents content of said given resource; and
      hierarchy data that indicates a position, within an information hierarchy, of each of said resources;
   wherein said plurality of resources are a first plurality of resources that belong to a first information hierarchy;
   storing metadata for a second plurality of resources in said hierarchy structures, wherein said metadata includes hierarchy data that indicates a position, within a second information hierarchy, of each of the resources in said second plurality of resources; and
   wherein the metadata for said first plurality of resources are stored in the same hierarchy structures as the metadata for said second plurality of resources.

4. A computer-implemented method for managing data stored in a database system the method comprising the steps of:
   storing information in content structures that are separate from hierarchy structures;
   storing metadata for a plurality of resources in said hierarchy structures, wherein said metadata includes:
      location data, associated with a given resource of said plurality of resources, that identifies which information in said content structures represents content of said given resource; and
      hierarchy data that indicates a position, within an information hierarchy, of each of said resources; and
   wherein:
      said content structures include a resource table;
      said given resource is a first resource that is represented by a first row of said resource table;
      said resource table includes a second row that represents a second resource; and
      the content of said second resource is stored in said second row, and not in any separate content structures.

5. A computer-implemented method for managing data stored in a database system, the method comprising the steps of:
   storing information in content structures that are separate from hierarchy structures;
   storing metadata for a plurality of resources in said hierarchy structures, wherein said metadata includes:
      location data, associated with a given resource of said plurality of resources, that identifies which information in said content structures represents content of said given resource; and
      hierarchy data that indicates a position, within an information hierarchy, of each of said resources; and
   wherein:
      a first table that has a row corresponding to each resource in the information hierarchy, wherein each row stores metadata about the resource to which the row corresponds; and
      a second table that identifies parent-child relationships of the resources that belong to said information hierarchy.

6. A computer-implemented method for managing data stored in a database system, the method comprising the steps of:
   storing information in content structures that are separate from hierarchy structures;
   storing metadata for a plurality of resources in said hierarchy structures wherein said metadata includes:

location data, associated with a given resource of said plurality of resources, that identifies which information in said content structures represents content of said given resource; and hierarchy data that indicates a position within an information hierarchy of each of said resources; and automatically deleting from the hierarchical structures metadata associated with the given resource in response to detecting when content associated with the given resource is deleted from said content structures.

7. A computer-implemented method for managing data stored in a database system, the method comprising the step of:

storing information in content structures that are separate from hierarchy structures;

storing metadata for a plurality of resources in said hierarchy structures, wherein said metadata includes:

location data, associated with a given resource of said plurality of resources, that identifies which information in said content structures represents content of said given resource; and hierarchy data that indicates a position, within an information hierarchy, of each of said resources; and automatically deleting from the content structures the content of the given resource in response to detecting when metadata associated with the given resource is deleted from said hierarchy structures.

8. The method of claim 6 further comprising storing, within the hierarchy structures, a value that specifies whether the database system should perform the step of automatically deleting from the hierarchical structures metadata associated with the given resource in response to detecting when content associated with the given resource is deleted from said content structures.

9. A computer-implemented method for managing data in a database, the method comprising the steps of:

storing, within the database, contents of resources that belong to an information hierarchy;

storing, within the database, data that captures the hierarchy of the resources that belong to said information hierarchy;

determining, based on one or more XML schemas, which metadata attributes to store for said resources;

creating one or more structures, within said database, to store said metadata attributes based on said one or more XML schemas; and storing, within said one or more structures, values for the metadata attributes associated with said resources.

10. The method of claim 9 wherein:

the one or more structures include a table that stores values for the metadata attributes associated with a particular resource;

the one or more XML schemas include a particular XML schema that indicates metadata attributes that apply to said particular resource;

the method further comprising the steps of:

receiving input that represents a change to said particular XML schema; and in response to said input, modifying the structure of said table.

11. The method of claim 9 wherein:

the particular XML schema is a first XML schema;

the step of receiving input includes receiving a second XML schema that identifies one or more metadata attributes that are not identified in said first XML schema; and the step of modifying the structure includes adding to said table columns that correspond to said one or more metadata attributes that are not identified in said first XML schema.

12. The method of claim 9 wherein:

the particular XML schema is a first XML schema; and the step of receiving input includes receiving a second XML schema that is declared as a subclass of said first XML schema.

13. The method of claim 9 wherein:

the step of determining, based on one or more XML schemas, which metadata attributes to store for said resources includes determining based on a first XML schema a first set of metadata attributes to store for a first resource; and determining based on a second XML schema a second set of metadata attributes to store for a second resource;

the step of storing, within said one or more structures, values for the metadata attributes associated with said resources includes storing values for said first set of metadata attributes for said first resource; and storing values for said second set of metadata attributes for said second resource.

14. The method of claim 13 wherein:

the step of storing values for said first set of metadata attributes includes storing in a particular table values for said first set of metadata attributes; and the step of storing values for said second set of metadata attributes includes storing in said particular table values for said second set of metadata attributes; and at least one attribute is not shared in common between said first set of metadata attributes and said second set of metadata attributes.

15. The method of claim 9 wherein the step of determining, based on one or more XML schemas, which metadata attributes to store for said resources includes determining, based on a particular XML schema associated with a user, which metadata attributes to store for resources associated with said user.

16. The method of claim 9 wherein the step of determining, based on one or more XML schemas, which metadata attributes to store for said resources includes determining, based on a particular XML schema associated with a particular node in the information hierarchy, which metadata attributes to store for resources that fall below said particular node in said information hierarchy.

17. The method of claim 9 wherein:

the step of determining, based on one or more XML schemas, which metadata attributes to store for said resources includes determining, based on said one or more XML schemas, that said resources may have values for metadata attributes that are not explicitly declared in said one or more XML schemas;

the step of creating one or more structures, within said database, to store said metadata attributes based on said one or more XML schemas includes creating a table that includes a catch-all column for storing data that corresponds to metadata attributes that are not explicitly declared in said one or more schemas; and the step of storing, within said one or more structures, values for the metadata attributes associated with said resources includes storing, within said catch-all column, values for metadata attributes that are not explicitly declared in said one or more schemas.

18. The method of claim 17 wherein the step of determining that said resources may have values for metadata attributes that are not explicitly declared includes the step of determining that an XML schema of said one or more XML schemas contains an "any" metadata attribute.

19. The method of claim 17 further comprising the step of storing, within said catch-all column, information that specifies labels for said metadata attributes that are not explicitly declared in said one or more schemas.

20. The method of claim 9 further comprising the steps of:
receiving data associated with a resource;
identifying an XML schema that dictates the metadata attributes that apply to said resource;
detecting that said resource includes
  first data associated with metadata attributes that are expressly identified in said XML schema; and
  second data associated with metadata attributes that are not expressly identified in said XML schema;
storing the first data in columns that correspond to said metadata attributes that are expressly identified in said XML schema; and
storing the second data in a catch-all column.

21. The method of claim 9 further comprising the steps of:
associating first scope information with a first XML schema of said one or more XML schemas, wherein said first scope information determines the resources, within said information hierarchy, to which said first XML schema applies; and
associating second scope information with a second XML schema of said one or more XML schemas, wherein said second scope information determines the resources, within said information hierarchy, to which said second XML schema applies; and
using said first scope information and said second scope information to determine which metadata attributes apply to a particular resource.

22. A computer-implemented method for adding data, associated with a resource, to a database, the method comprising the steps of:
receiving, at a database server that manages the database, the data for the resource;
inspecting the data to locate content-type information in the data;
storing values for a set of metadata attributes for said resource in a first set of one or more tables without regard to any content-type information in the data;
selecting a second set of one or more tables based on content-type information found in said data; and
storing values for resource attributes of said resource in said second set of one or more tables.

23. The method of claim 22 wherein the step of selecting a second set of one or more tables based on content-type information found in said data includes inspecting a content-type to content-structure mapping to determine that a content-type indicated in said content-type information maps to said second set of one or more tables.

24. The method of claim 22 wherein said resource is a first resource, the method further comprising the steps of:
receiving, at said database server that manages the database, second data for a second resource;
inspecting the second data to locate second content-type information in the second data, wherein the second content-type information indicates that said second resource has a different type of content than said first resource;
storing values for metadata attributes of said second resource in said first set of one or more tables without regard to any content-type information in the second data;
selecting a third set of one or more tables based on content-type information found in said second data; and
storing values for resource attributes of said second resource in said third set of one or more tables.

25. The method of claim 22 wherein the step of inspecting the data to locate content-type information includes searching for tags, within said data, that demarcate content-type information.

26. The method of claim 22 wherein said resource is a first resource, the method further comprising the steps of:
receiving, at said database server that manages the database, second data for a second resource;
searching the second data for second content-type information in the second data;
storing values for metadata attributes of said second resource in said first set of one or more tables without regard to any content-type information in the second data;
in response to failing to find any content-type information in said second data, storing values for resource contents of said second resource in a default container.

27. The method of claim 26 wherein the default container is a LOB column within a resource table that belongs to said first set of one or more tables.

28. A tangible computer-readable medium carrying instructions for managing data stored in a database system, wherein said instructions are instructions which when executed by one or more processors, cause the one or more processors to perform the steps of:
storing information in content structures that are separate from hierarchy structures;
storing metadata for a plurality of resources in said hierarchy structures, wherein said metadata includes:
  location data, associated with a given resource of said plurality of resources, that identifies which information in said content structures represents content of said given resource; and
  hierarchy data that indicates a position, within an information hierarchy of each of said resources; and
wherein:
  said content structures include a resource table;
  said given resource is a first resource that is represented by a first row of said resource table;
  location data for said first resource indicates that information in a first set of one or more tables represents content of said first resource;
  said resource table includes a second row that represents a second resource;
  location data for said second resource indicates that information in a second set of one or more tables represents content for said second resource; and
  said first set of one or more tables are different tables than said second set of one or more tables.

29. A tangible computer-readable medium carrying instructions for managing data stored in a database system, wherein said instructions are instructions which, when executed by one or more processors, cause the one or more processors to perform the steps of:
storing information in content structures that are separate from hierarchy structures;
storing metadata for a plurality of resources in said hierarchy structures, wherein said metadata includes:
  location data, associated with a given resource of said plurality of resources, that identifies which information in said content structures represents content of said given resource; and hierarchy data that indicates a position, within an information hierarchy of each of said resources; and
wherein:
the content structures do not store data that reflects the hierarchy of information in said information hierarchy;
the instructions further comprising instructions for performing the steps of:
creating said hierarchy structures after said content structures are created and populated; and
after creating said hierarchy structures, populating said hierarchy structures with metadata that establishes a hierarchy between information stored in said content structures without altering the structure of said content structures.

30. A tangible computer-readable medium carrying instructions for managing data stored in a database system wherein said instructions are instructions which, when executed by one or more processors, cause the one or more processors to perform the steps of:
storing information in content structures that are separate from hierarchy structures;
storing metadata for a plurality of resources in said hierarchy structures, wherein said metadata includes:
location data, associated with a given resource of said plurality of resources, that identifies which information in said content structures represents content of said given resource; and
hierarchy data that indicates a position, within an information hierarchy, of each of said resources; and
wherein:
said plurality of resources are a first plurality of resources that belong to a first information hierarchy;
the instructions further comprise instructions for performing the step of storing metadata for a second plurality of resources in said hierarchy structures, wherein said metadata includes hierarchy data that indicates a position, within a second information hierarchy, of each of the resources in said second plurality of resources; and
the metadata for said first plurality of resources are stored in the same hierarchy structures as the metadata for said second plurality of resources.

31. A tangible computer-readable medium carrying instructions for managing data stored in a database system, wherein said instructions are instructions which, when executed by one or more processors, cause the one or more processors to perform the steps of:
storing information in content structures that are separate from hierarchy structures;
storing metadata for a plurality of resources in said hierarchy structures, wherein said metadata includes:
location data, associated with a given resource of said plurality of resources, that identifies which information in said content structures represents content of said given resource; and
hierarchy data that indicates a position, within an information hierarchy, of each of said resources; and
wherein:
said content structures include a resource table;
said given resource is a first resource that is represented by a first row of said resource table;
said resource table includes a second row that represents a second resource; and
the content of said second resource is stored in said second row, and not in any separate content structures.

32. A tangible computer-readable medium carrying instructions for managing data stored in a database system, wherein said instructions are instructions which, when executed by one or more processors, cause the one or more processors to perform the steps of:
storing information in content structures that are separate from hierarchy structures;
storing metadata for a plurality of resources in said hierarchy structures, wherein said metadata includes:
location data, associated with a given resource of said plurality of resources, that identifies which information in said content structures represents content of said given resource; and
hierarchy data that indicates a position, within an information hierarchy, of each of said resources; and
wherein:
a first table that has a row corresponding to each resource in the information hierarchy, wherein each row stores metadata about the resource to which the row corresponds; and
a second table that identifies parent-child relationships of the resources that belong to said information hierarchy.

33. A tangible computer-readable medium carrying instructions for managing data stored in a database system, wherein said instructions are instructions which, when executed by one or more processors, cause the one or more processors to perform the steps of:
storing information in content structures that are separate from hierarchy structures;
storing metadata for a plurality of resources in said hierarchy structures, wherein said metadata includes:
location data, associated with a given resource of said plurality of resources, that identifies which information in said content structures represents content of said given resource; and
hierarchy data that indicates a position, within an information hierarchy of each of said resources; and
automatically deleting from the hierarchical structures metadata associated with the given resource in response to detecting when content associated with the given resource is deleted from said content structures.

34. A tangible computer-readable medium carrying instructions for managing data stored in a database system, wherein said instructions are instructions which, when executed by one or more processors, cause the one or more processors to perform the steps of:
storing information in content structures that are separate from hierarchy structures;
storing metadata for a plurality of resources in said hierarchy structures, wherein said metadata includes:
location data, associated with a given resource of said plurality of resources, that identifies which information in said content structures represents content of said given resource; and
hierarchy data that indicates a position, within an information hierarchy, of each of said resources; and
automatically deleting from the content structures the content of the given resource in response to detecting when metadata associated with the given resource is deleted from said hierarchy structures.

35. The computer-readable medium of claim 33 further comprising instructions for performing the step of storing, within the hierarchy structures, a value that specifies whether the database system should perform the step of automatically deleting from the hierarchical structures metadata associated with the given resource in response to detecting when content associated with the given resource is deleted from said content structures.

36. A tangible computer-readable medium carrying instructions for managing data in a database, wherein said instructions are instructions which, when executed by one or more processors, cause the one or more processors to perform the steps of:
    storing, within the database, contents of resources that belong to an information hierarchy;
    storing, within the database, data that captures the hierarchy of the resources that belong to said information hierarchy;
    determining, based on one or more XML schemas, which metadata attributes to store for said resources;
    creating one or more structures, within said database, to store said metadata attributes based on said one or more XML schemas; and
    storing, within said one or more structures, values for the metadata attributes associated with said resources.

37. The computer-readable medium of claim 36 wherein:
    the one or more structures include a table that stores values for the metadata attributes associated with a particular resource;
    the one or more XML schemas include a particular XML schema that indicates metadata attributes that apply to said particular resource;
    the instructions further comprising instructions for performing the steps of:
        receiving input that represents a change to said particular XML schema; and
        in response to said input, modifying the structure of said table.

38. The computer-readable medium of claim 37 wherein:
    the particular XML schema is a first XML schema;
    the step of receiving input includes receiving a second XML schema that identifies one or more metadata attributes that are not identified in said first XML schema; and
    the step of modifying the structure includes adding to said table columns that correspond to said one or more metadata attributes that are not identified in said first XML schema.

39. The computer-readable medium of claim 37 wherein:
    the particular XML schema is a first XML schema; and
    the step of receiving input includes receiving a second XML schema that is declared as a subclass of said first XML schema.

40. The computer-readable medium of claim 36 wherein:
    the step of determining, based on one or more XML schemas, which metadata attributes to store for said resources includes
        determining based on a first XML schema a first set of metadata attributes to store for a first resource; and
        determining based on a second XML schema a second set of metadata attributes to store for a second resource;
    the step of storing, within said one or more structures, values for the metadata attributes associated with said resources includes
        storing values for said first set of metadata attributes for said first resource; and
        storing values for said second set of metadata attributes for said second resource.

41. The computer-readable medium of claim 40 wherein:
    the step of storing values for said first set of metadata attributes includes storing in a particular table values for said first set of metadata attributes; and
    the step of storing values for said second set of metadata attributes includes storing in said particular table values for said second set of metadata attributes; and
    at least one attribute is not shared in common between said first set of metadata attributes and said second set of metadata attributes.

42. The computer-readable medium of claim 36 wherein the step of determining, based on one or more XML schemas, which metadata attributes to store for said resources includes determining, based on a particular XML schema associated with a user, which metadata attributes to store for resources associated with said user.

43. The computer-readable medium of claim 36 wherein the step of determining, based on one or more XML schemas, which metadata attributes to store for said resources includes determining, based on a particular XML schema associated with a particular node in the information hierarchy, which metadata attributes to store for resources that fall below said particular node in said information hierarchy.

44. The computer-readable medium of claim 36 wherein:
    the step of determining, based on one or more XML schemas, which metadata attributes to store for said resources includes determining, based on said one or more XML schemas, that said resources may have values for metadata attributes that are not explicitly declared in said one or more XML schemas;
    the step of creating one or more structures, within said database, to store said metadata attributes based on said one or more XML schemas includes creating a table that includes a catch-all column for storing data that corresponds to metadata attributes that are not explicitly declared in said one or more schemas; and
    the step of storing, within said one or more structures, values for the metadata attributes associated with said resources includes storing, within said catch-all column, values for metadata attributes that are not explicitly declared in said one or more schemas.

45. The computer-readable medium of claim 44 wherein the step of determining that said resources may have values for metadata attributes that are not explicitly declared includes the step of determining that an XML schema of said one or more XML schemas contains an "any" metadata attribute.

46. The computer-readable medium of claim 44 further comprising instructions for performing the step of storing, within said catch-all column, information that specifies labels for said metadata attributes that are not explicitly declared in said one or more schemas.

47. The computer-readable medium of claim 36 further comprising instructions for performing the steps of:
    receiving data associated with a resource;
    identifying an XML schema that dictates the metadata attributes that apply to said resource;
    detecting that said resource includes
        first data associated with metadata attributes that are expressly identified in said XML schema; and
        second data associated with metadata attributes that are not expressly identified in said XML schema;
    storing the first data in columns that correspond to said metadata attributes that are expressly identified in said XML schema; and
    storing the second data in a catch-all column.

48. The computer-readable medium of claim 36 further comprising instructions for performing the steps of:
    associating first scope information with a first XML schema of said one or more XML schemas, wherein said first scope information determines the resources, within said information hierarchy, to which said first XML schema applies; and associating second scope information with a second XML schema of said one or more XML schemas, wherein said second scope information determines the resources, within said information hierarchy, to which said second XML schema applies; and using said first scope information and said second scope information to determine which metadata attributes apply to a particular resource.

49. A tangible computer-readable medium carrying instructions for adding data, associated with a resource, to a database, wherein said instructions comprising are instructions which, when executed by one or more processors cause the one or more processors to perform the steps of:

receiving, at a database server that manages the database, the data for the resource;

inspecting the data to locate content-type information in the data;

storing values for a set of metadata attributes for said resource in a first set of one or more tables without regard to any content-type information in the data;

selecting a second set of one or more tables based on content-type information found in said data; and storing values for resource attributes of said resource in said second set of one or more tables.

50. The computer-readable medium of claim 49 wherein the step of selecting a second set of one or more tables based on content-type information found in said data includes inspecting a content-type to content-structure mapping to determine that a content-type indicated in said content-type information maps to said second set of one or more tables.

51. The computer-readable medium of claim 49 wherein said resource is a first resource, the instructions further comprising instructions for performing the steps of:

receiving, at said database server that manages the database, second data for a second resource;

inspecting the second data to locate second content-type information in the second data, wherein the second content-type information indicates that said second resource has a different type of content than said first resource;

storing values for metadata attributes of said second resource in said first set of one or more tables without regard to any content-type information in the second data;

selecting a third set of one or more tables based on content-type information found in said second data; and storing values for resource attributes of said second resource in said third set of one or more tables.

52. The computer-readable medium of claim 49 wherein the step of inspecting the data to locate content-type information includes searching for tags, within said data, that demarcate content-type information.

53. The computer-readable medium of claim 49 wherein said resource is a first resource, the instructions further comprising instructions for performing the steps of:

receiving, at said database server that manages the database, second data for a second resource;

searching the second data for second content-type information in the second data;

storing values for metadata attributes of said second resource in said first set of one or more tables without regard to any content-type information in the second data;

in response to failing to find any content-type information in said second data, storing values for resource attributes of said second resource in a default container.

54. The computer-readable medium of claim 53 wherein the default container is a LOB column within a resource table that belongs to said first set of one or more tables.

* * * * *

UNITED STATES PATENT AND TRADEMARK OFFICE
CERTIFICATE OF CORRECTION

| | |
|---|---|
| PATENT NO. | : 7,047,253 B1 |
| APPLICATION NO. | : 10/256524 |
| DATED | : May 16, 2006 |
| INVENTOR(S) | : Ravi Murthy et al. |

It is certified that error appears in the above-identified patent and that said Letters Patent is hereby corrected as shown below:

Claim 11, column 17, line 62, "claim 9 wherein:" should read --claim 10 wherein:--,
Claim 12, column 18, line 5, "claim 9 wherein:" should read --claim 10 wherein:--.

Signed and Sealed this

Twenty-second Day of August, 2006

JON W. DUDAS
*Director of the United States Patent and Trademark Office*